United States Patent [19]

Van Den Abeele

[11] Patent Number: 4,757,851

[45] Date of Patent: Jul. 19, 1988

[54] FLEXIBLE LOCKING MEMBER FOR A WHEEL RIM FLANGE RETAINING RING ASSEMBLY

[75] Inventor: John P. Van Den Abeele, Mishawaka, Ind.

[73] Assignee: Allied Corporation, Morristown, N.J.

[21] Appl. No.: 845,216

[22] Filed: Mar. 27, 1986

[51] Int. Cl.⁴ .............................................. B60B 25/18
[52] U.S. Cl. .................... 152/410; 152/389; 152/396
[58] Field of Search ............... 301/35 SL, 35 SS, 23; 152/409, 410, DIG. 10, 401, 402, 405, 406, 407, 408, 389, 390, 391, 396; 403/326, 344; 24/128 R, 116 A

[56] References Cited

U.S. PATENT DOCUMENTS

| | | |
|---|---|---|
| 940,602 | 11/1909 | Kirsch . |
| 959,236 | 5/1910 | Ley ........................... 152/407 |
| 1,088,349 | 2/1914 | Küller . |
| 1,161,348 | 11/1915 | Selzer . |
| 1,315,009 | 9/1919 | Clements . |
| 1,362,340 | 12/1920 | Moore . |
| 2,902,736 | 9/1959 | Hampe ........................ 403/344 X |
| 3,106,237 | 10/1963 | Holmes ....................... 152/410 |
| 3,335,468 | 8/1967 | Harley ........................ 24/128 R X |
| 3,608,607 | 9/1971 | Gerbeth ....................... 152/410 |
| 4,043,375 | 8/1977 | Casey .......................... 157/1 |
| 4,209,052 | 6/1980 | French ........................ 152/410 |
| 4,552,194 | 11/1985 | Brown et al. ................. 152/410 |
| 4,554,961 | 11/1985 | Osawa et al. ................. 152/410 |

Primary Examiner—Robert B. Reeves
Assistant Examiner—Russell D. Stormer
Attorney, Agent, or Firm—Larry J. Palguta; Ken C. Decker

[57] ABSTRACT

A wheel rim assembly (10) includes a first bead flange and a separable second bead flange (16), the separable second bead flange (16) being maintained on the rim assembly (10) by a separated retaining ring assembly (20). Each terminal end (22) of the retaining ring assembly (20) has an arcuately shaped bore (24) extending circumferentially, the bore (24) having an enlarged opening area (30) communicating with an axial opening (28) located at the outboard axial surface (23) of the retaining ring assembly (20). Located within the bores (24) is a flexible locking member (40) comprising a stranded wire cable (42) having balls (44) affixed securely thereto, the balls (44) being captured within the enlarged opening areas (30) and the flexible cable (42) being maintained within the arcuately shaped bores (24) by means of retaining connections (36) received in radial openings (34) passing through the terminal ends (22) and bores (24) of the retaining ring assembly (20). Stress or tensioning of the flexible cable (42) causes it to be biased into engagement with the retaining connections (36).

10 Claims, 2 Drawing Sheets

FLEXIBLE LOCKING MEMBER FOR A WHEEL RIM FLANGE RETAINING RING ASSEMBLY

This invention relates to a wheel rim assembly having a separable bead flange retained in place by a retaining ring assembly, one end of each retaining ring half being held together by means of a flexible locking member assembly.

Aircraft wheel assemblies comprise an inflatable tire which is first mounted on the wheel rim and then followed by a separable bead flange which is maintained in place by a retaining ring. Upon inflation of the mounted tire, the outboard tire bead forces the separable bead flange into tight contacting engagement with the retaining ring. When the tire is deflated, the retaining ring is removed first and followed by the separable bead flange and finally the deflated tire. In the circumstance of a tire blowing out during high speed travel, the outboard tire bead tends to move inboardly and allow the separable bead flange to follow in the same direction. With the displacement of the outboard tire bead, the retaining ring may be lost and thrown off the wheel rim by the high centrifugal forces which are present. Therefore, it is desirable to provide a retaining ring which will remain in place when a tire blowout occurs at high speed, and also to provide a low cost, easily manufactured and installed locking member for the retaining ring. It is preferable that the locking member be easily inspected to determine if it is properly installed and in place, and has a construction such that the potential for damage to the retaining ring and locking member is minimized. Thus, the locking member should be small and light and have no protruding parts which could be damaged by personnel working on the wheel.

The present invention comprises a wheel rim assembly having a first bead flange, a separable second bead flange, and a retaining ring assembly having a separation defining circumferentially oriented terminal ends, the retaining ring assembly having inboard and outboard facing portions, the inboard facing portion being received within a groove in the rim to secure the separable second bead flange on the rim, and the retaining ring assembly comprising a first circumferentially extending bore in each terminal end of the retaining ring, each bore having one axial side comprising an opening on the outboard facing portion of the retaining ring assembly, each bore having an enlarged opening area which also extends axially to said opening at the outboardfacing portion, and a radially oriented opening extending through each terminal end and communicating with the respective bore. A flexible locking member comprises flexible cable means having at each end an enlarged member fixed securely thereto, each end of the flexible locking member being disposed in a respective bore and the enlarged member being disposed in the respective enlarged opening, and a pair of retaining connections disposed in said radial openings so as to engage said flexible member and retain the flexible member within the bores.

One way of carrying out the invention is described in detail below with reference to the drawings which illustrate an embodiment in which.

Figure 1:
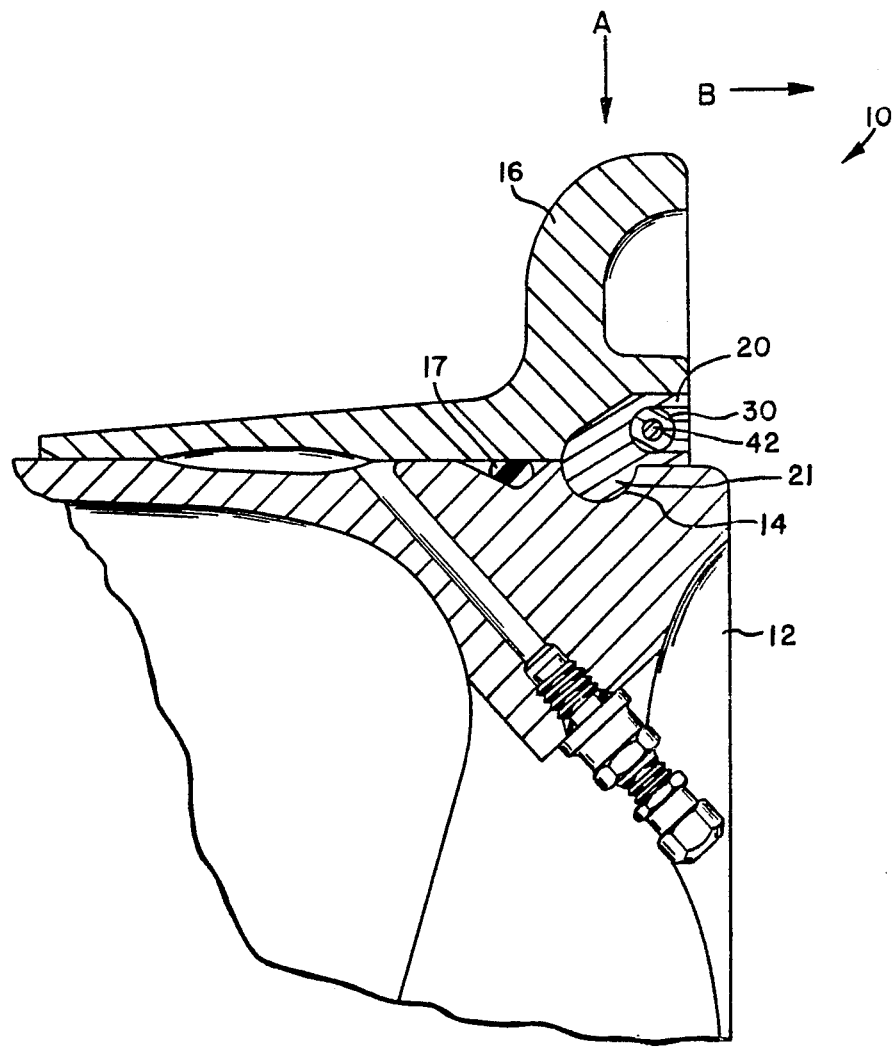
FIG. 1 is a section view taken along view line 1—1 of the wheel rim, separable second bead flange and retaining ring assembly.

The wheel rim assembly is designated generally by reference numeral 10. Rim assembly 10 comprises the wheel hub 12 which has therein a circumferential and radially extending groove 14, with a separable second bead flange 16 mouinted onto hub 12 and held in place by a separated retaining ring assembly assembly 20. A first or inboard bead flange (not shown) is an integral part of the wheel hub 12. The separable second bead flange 16 slides axially onto hub 12 to trap sealing means 17 there between, and retaining ring assembly 20 includes a lobe 21 disposed within the groove 14. When an inflatable tire (not shown) is disposed about wheel assembly 10, the tire is inflated to force separable second bead flange 16 radially inwardly in the direction of Arrow A and axially in the direction of Arrow B. Retaining ring assembly 20 is captured between flange 16 and the hub 12, with flange 16 maintained axially in place by lobe 21 of assembly 20 so that flange 16 cannot be displaced further in the direction of Arrow B.

Figure 2:
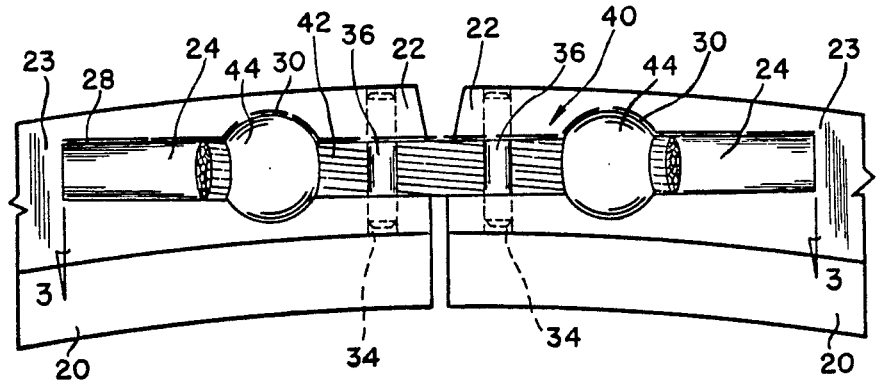
FIG. 2 is a side view of a portion of the retaining ring assembly and flexible locking member.
Figure 3:
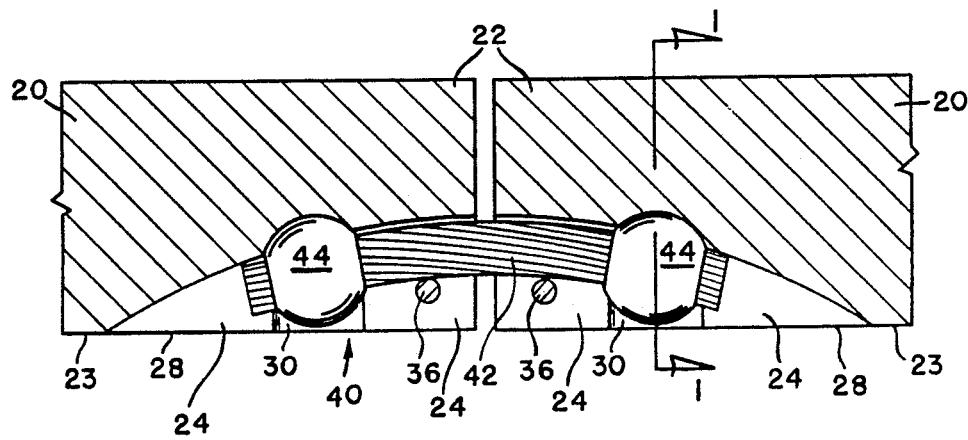
FIG. 3 is a section view taken along view line 3—3 of FIG. 2.
Figure 4:
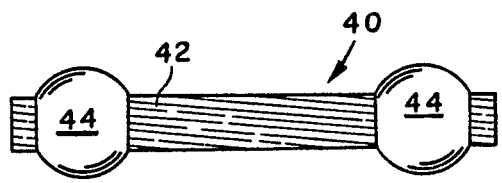
FIG. 4 is the flexible locking member of the present invention.

Referring to FIG. 2, the retaining ring assembly 20 includes two halves which meet at terminal ends 22 each of which have identically shaped circumferential bores 24 that are arcuately shaped and extending when viewed radially from above (see FIG. 3). The bores 24 each communicate with an axial opening 28 which is disposed at the outboard axial surface 23 of terminal ends 22. Each bore 24 includes an enlarged opening area 30 which also communicates with the opening 28 at the outward axial surface 23. Terminal ends 22 include radial openings 34 each having therein a press fit/threaded pin or retaining connection 36. Located within bores 24 is a flexible locking member 40 comprising a flexible stranded cable 42 having hardened balls 44 affixed one at each end thereof. The flexible stranded cable 42 is disposed within the bores 24 and the balls 44 received within complementary shaped opening areas 30. As illustrated in FIG. 3, the bores 24 extend arcuately so that when flexible locking member 40 is in position, the tightening together of the opposite ends of assembly 20 may cause terminal ends 22 to separate circumferentially and stress flexible stranded cable 42 toward a non-arcuate or straightened position so that it is biased into engagement with the retaining connections 36. The retaining connections 36 maintain in place the flexible locking member 40.

The wheel assembly 10 is assembled by placing an inflatable tire onto wheel hub 12, and then separable second bead flange 16 is positioned on hub 12 so that flange 16 engages the outboard bead of the inflatable tire. The retaining ring assembly is placed in position so that lobe 21 is received within groove 14. Ends of ring assembly 20 which are opposite the terminal ends 22 and locking member 40 are fastened together. Then the tire is inflated and flange 16 is biased axially and radially against locking ring 20. The inflatable tire is removed by simply reversing the above procedure.

The flexible locking member of the present invention greatly facilitates the installation and removal of the retaining ring assembly of the wheel assembly. Because the retaining ring assembly is located on the outboard side and easily viewed by maintenance personnel, inadvertent ommission of the retaining ring assembly is prevented and the easy viewing facilitates inspection of the flexible locking member for conclusive determination of structural integrity and function on a fully assembled wheel assembly when the tire is inflated. Because the stranded cable is flexible, it is difficult to break or damage the locking member during installation or removal. If an inflexible member were utilized, this would provide a possible leverage point which would be damaged or twisted when personnel removed the separable flange from the wheel. The flexible locking member comprises parts which are easily and economically produced and replaced, and it minimizes its impact upon the size and weight of the entire retaining ring assembly. There are no protruding parts from the retaining ring assembly and, therefore, the possibility of damage to the locking member is minimized. Additionally, the contact area between the separable bead flange and retaining ring assembly is maximized because the assembly requires only a small separation between the terminal ends of the retaining ring assembly. The flexible locking member resists damage which could be caused by tension, compression, bending, or torsional loads that may be experienced during handling whenever the retaining ring assembly is not mounted on the wheel. Finally, the flexible locking member will keep the retaining ring assembly in place on the wheel assembly during a high speed blow out of a tire, so that the retaining ring assembly is not thrown from the wheel assembly and result in the separable bead flange also being thrown off the hub of the wheel assembly.

Although the present invention has been illustrated and described in connection with example embodiments, it will be understood that this is illustrative of the invention, and is by no means restrictive, thereof. It is reasonably to be expected that those skilled in the art can make numerous revisions and additions to the invention and it is intended that such revisions and additions will be included in the scope of the following claims as equivalents of the invention.

I claim:

1. In a wheel rim assembly having a first bead flange, a separable second bead flange, and a retaining ring assembly having a separation defining circumferentially oriented terminal ends, said retaining ring assembly having inboard and outboard facing portions, the inboard facing portion being received within a groove in the rim to secure the separable second bead flange on the rim, the retaining ring assembly comprising:

a first circumferentially extending bore in each terminal end of the retaining ring assembly, each bore having one axial side comprising an opening on an outboard-facing portion of the retaining ring assembly, each bore having an enlarged opening area disposed interiorly of the respective terminal end and which also extends axially to said opening at the outboard-facing portion, and a radially oriented opening extending through each terminal end and communicating with the respective bore, a flexible locking member comprising flexible cable means having at each end an enlarged member fixed securely thereto, each end of the flexible locking member being disposed in a respective bore and the enlarged member being disposed in the respective enlarged opening area, and a pair of retaining connections disposed in said radially oriented openings so as to engage and retain the flexible member within the bores.

2. The retaining ring assembly in accordance with claim 1, wherein each enlarged member comprises a hardened annular member fixed securely to the respective end of said cable means and shaped complementary to the associated opening area so that the opening area surrounds and engages a substantial portion of the annular member.

3. The retaining ring assembly in accordance with claim 1, wherein said retaining connections comprise threaded rods secured within said radial openings.

4. The retaining ring assembly in accordance with claim 1, wherein said bores extend axially in an arcuate shape so as to cause said flexible cable means to be biased into engagement with said retaining connections.

5. The retaining ring assembly in accordance with claim 1, wherein said retaining connections are press fit into said radial openings.

6. A wheel rim assembly having a first bead flange, a separable second bead flange, and a retaining ring assembly having a separation defining circumferentially oriented terminal ends, said retaining ring assembly having inboard and outboard facing portions, the inboard facing portion being received within a groove in the rim to secure the separable second bead flange on the rim, characterized in that the retaining ring assembly comprises a first circumferentially extending bore in each terminal end of the retaining ring assembly, each bore having one axial side opening at a radial surface of the retaining ring assembly, each bore having an enlarged opening area disposed interiorly of the respective terminal end and which communicates with the radial surface, a radially oriented opening extending radially through each terminal end and communicating with the respective bore, a flexible locking member comprising flexible cable means having at each end an enlarged member fixed securely thereto, each end of the flexible locking member disposed in a respective bore and the enlarged member housed in the respective enlarged opening area, and a pair of retaining connections disposed in said radially oriented openings in order to retain the flexible member within the bores.

7. The retaining ring assembly in accordance with claim 6, characterized in that each enlarged member comprises a hardened annular member fixed securely to the respective end of said cable means and shaped complementary to the associated opening area so that the opening area surrounds and engages a substantial portion of the annular member.

8. The retaining ring assembly in accordance with claim 6, characterized in that said retaining cnnections comprise threaded rods secured within said radial openings.

9. The retaining ring assembly in accordance with claim 6, characterized in that said bores extend axially in an arcuate shape and cause said flexible cable means to be biased into engagement with said retaining connections.

10. The retaining ring assembly in accordance with claim 6, characterized in that said retaining connections are press fit into said radial openings.

* * * * *